United States Patent Office 3,041,767
Patented July 3, 1962

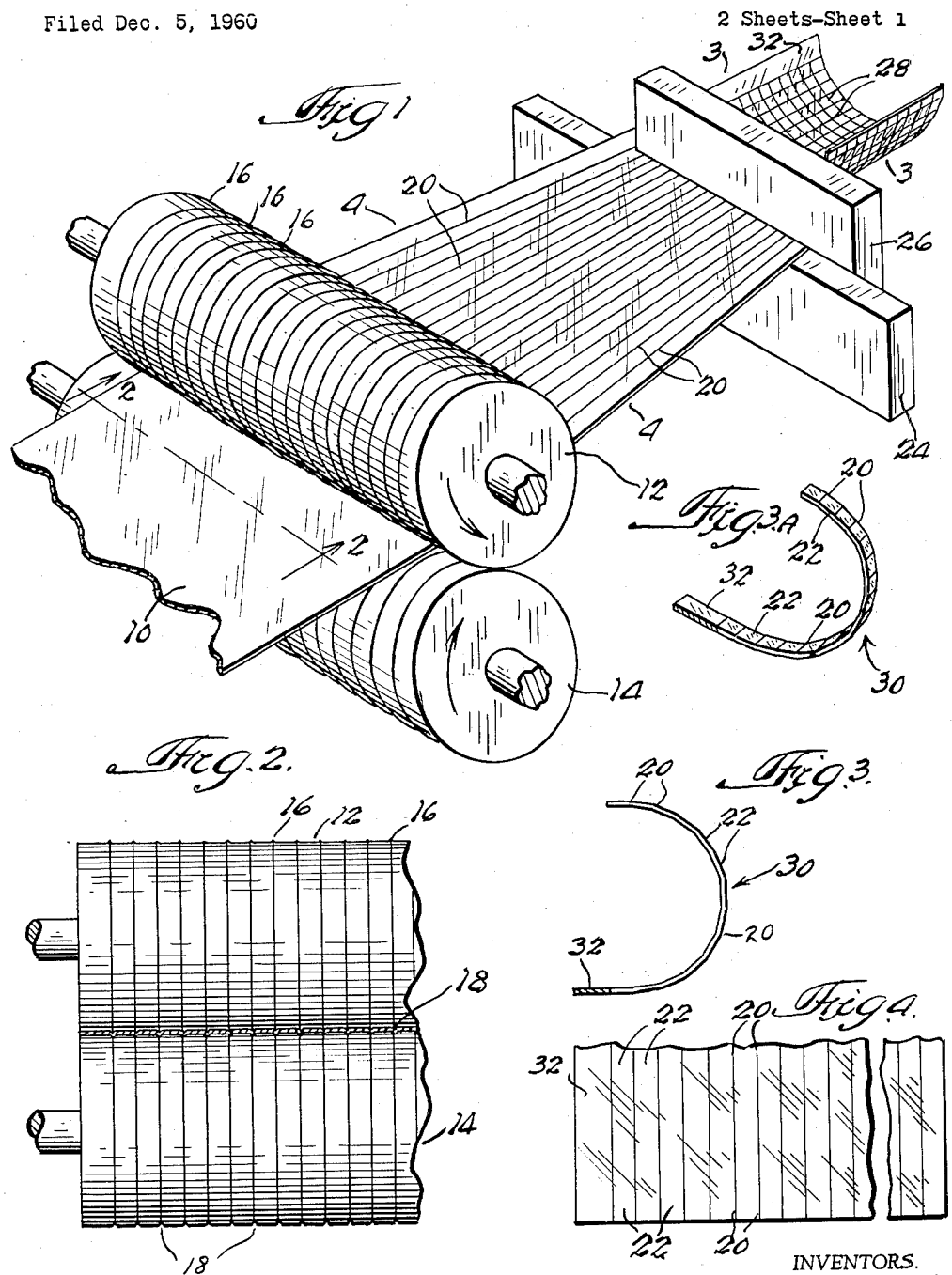

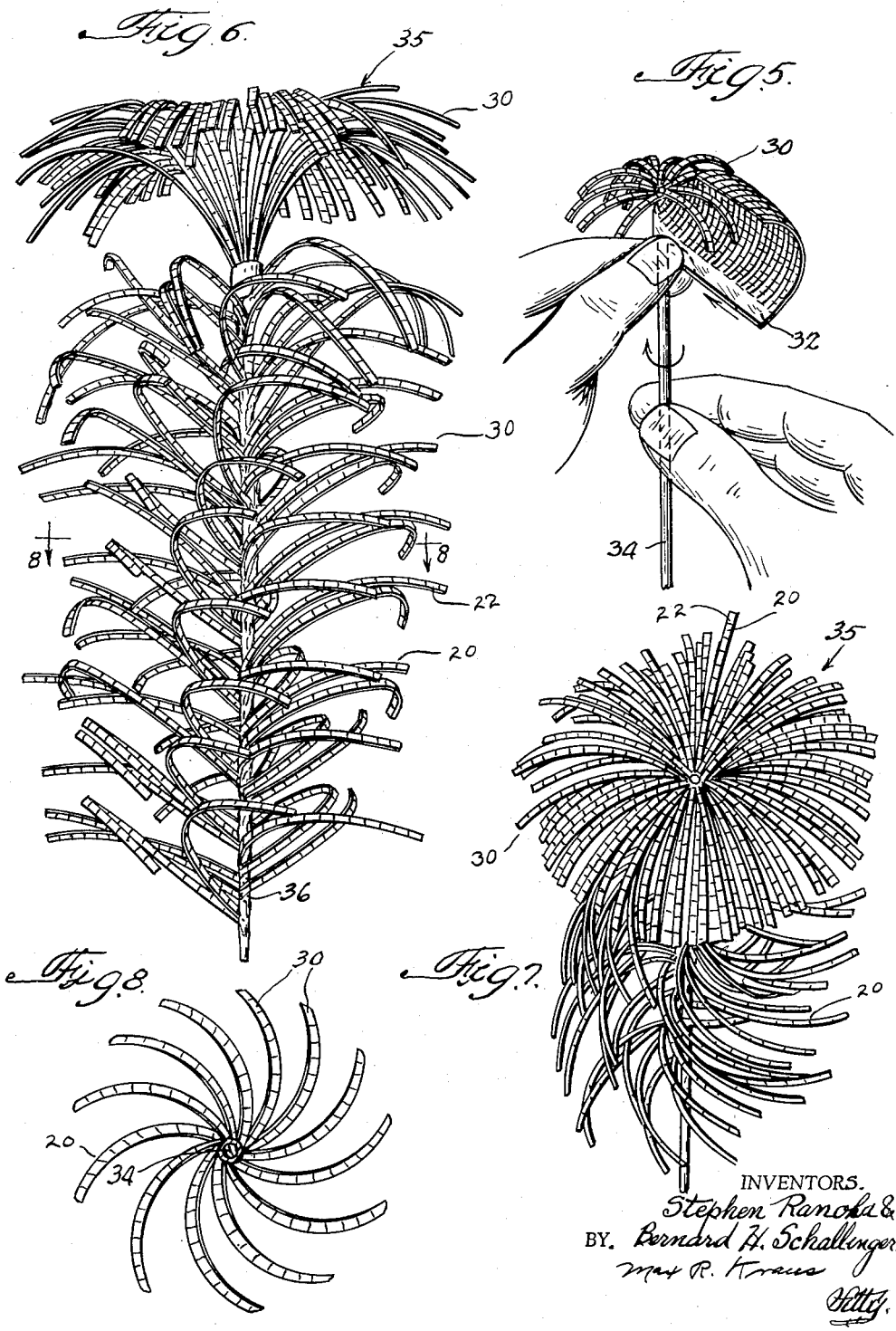

3,041,767
ARTIFICIAL TREES
Stephen Ranoha, 1850 N. Milwaukee Ave., and Bernard H. Schallinger, 1801 N. Wolcott Ave., both of Chicago, Ill.
Filed Dec. 5, 1960, Ser. No. 73,901
5 Claims. (Cl. 41—15)

This invention relates to artificial trees and more particularly to the branches forming the artificial tree.

This invention is directed to artificial trees, generally of the type shown in Patents No. 2,889,650 and No. 2,893,149, in which the branches forming the tree are made from a strip of material, preferably a metal foil, which has a marginal edge and a plurality of fingers and is helically wound around a rod.

This disadvantages of the trees formed in accordance with the aforesaid patents is that the tree appears sparse and not filled out. The fingers of the branches are such that spaces and voids appear between the branches and therefore in order to give the tree an appearance of fullness a greater number of branches must be used, and even with a greater number of branches the voids or spaces between the branches are still apparent.

It is therefore an object of the present invention to provide an artificial tree formed of branches so constructed that even with fewer branches the body of the tree will have a completeness and fullness not attainable by trees of the prior art. The appearance of voids and spaces between the branches is eliminated. The removable branches in the stem may be positioned in any arrangement, either like that shown in the aforementioned patents or otherwise, and when so positioned, even with a reduced number of branches a dense tree body effect will be produced.

Another object of this invention is to provide a branch for an artificial tree in which the fingers of the branch along its length are curved or bowed and have equally spaced embossings or indentations extending transversely of the finger and along the length thereof to provide sectional surfaces or facets between the indentations.

Another object of this invention is to provide a branch for an artificial tree which comprises fingers which have transverse scorings or embossings along the length of the finger so that the finger assumes an arched, curved or bowed shape and forms equally spaced substantially flat surfaces or facets along the length of the finger, the scorings or embossings forming and producing the curve of the finger.

Another object of this invention is to provide a branch in which the strip is wrapped around the upper portion of the rod so that the fingers form a cluster or umbrella shaped tip. The multiple sectional surfaces or facets of the fingers formed in accordance with this invention produces an unusual visual effect. The tiniest gleam of light is caught, its brilliance is highly magnified and radiated and a shimmering effect is produced. The tips of the branches create a sunbrust effect.

Another object of this invention is to provide an artificial tree formed of branches of the character hereinbefore described in which the branches may be economically produced and wherein the tree may be assembled and disassembled and stored for repeated use.

Other objects will become apparent as this description progresses.

In the drawings:

FIGURE 1 is a view of the structure for forming and slitting the foil fingers.

FIGURE 2 is a view taken on lines 2—2 of FIGURE 1.

FIGURE 3 is a view taken on lines 3—3 of FIGURE 1.

FIGURE 3A is a perspective view of one of the fingers.

FIGURE 4 is a view taken on lines 4—4 of FIGURE 1.

FIGURE 5 is a view showing the formation of the tip of the branch.

FIGURE 6 is a view showing a completed branch.

FIGURE 7 is a view of FIGURE 6, viewed from the top, and

FIGURE 8 is a view taken on lines 8—8 of FIGURE 6.

Reference will first be had to FIGURES 1 and 2, showing one form of structure for the formation of the metallic strip prior to the winding of same on the individual rods which form the branches. As shown in FIGURE 1, a strip of aluminum foil 10 approximately three inches in width is supported on a supporting roll, not shown, and is fed therefrom so as to pass between a pair of rollers 12 and 14.

The upper roller 12 is shaped to provide spaced annular raised portions or ribs 16 and the lower roller 14 is provided with complementary annular depressions or female portions 18 into which the ribs 16 extend. As the strip 10 passes between the cooperating rollers 12 and 14, the ribs 16 and depressions 18 produce equally spaced indentations, scorings or embossings 20 across the width of the strip 10 and continuously along its length. The strip surfaces between each pair of adjacent indentations 20 are substantially flat as at 22. After the strip has been thus indented, scored or embossed it continues forwardly and passes over a shear table 24 and is cut by a reciprocating cutter element 26 which slits the strip as at 28 into equal width fingers or needles 30. The foil strip is slitted or cut from one side and continues short of the opposite side to provide a continuous narrow marginal longitudinal securing edge 32. After the strip is cut by the cutting element 26 it curls or curves to assume the shape shown at the upper end of FIGURE 1.

The shape of an individual finger is best shown in FIGURES 3 and 3A, and as therein seen the finger assumes an arcuate or bowed shape along its length. The finger has the equally spaced transversely extending indentations or embossings 20 and is provided with substantially flat sectional surfaces 22 which form the facets of the finger. The slitted strip is then wound around a holder, not shown, and is adapted to be unrolled by the operator in forming the branch, now to be described.

A rod 34, of metal or any other type of material, is used on which the strip is wound for the purpose of forming the branch. The length of the branch is obviously dependent upon the length of the rod, and while the length of the rods may differ, the appearance and construction of the constructed branch will be the same. The rod 34 is covered with a mucilage or glue and the strip of material which has been indented, slitted and curved, as heretofore described, is positioned against the upper end of the rod so that the marginal edge 32 engages the upper end of the rod, with the curved fingers 30 facing upwardly and outwardly, as best seen in FIGURE 5. In this manner the marginal edge 32 is wound around the tip end of the rod approximately four times on substantially the same plane. A piece of pressure sensitized tape is then wound around the marginal edge 32 to secure the windings of the strip around the upper end of the rod. The marginal edge 32 is then wound once again around the previous windings to cover the pressure sensitized tape. These windings produce a branch tip 35 with fingers which arch upwardly and outwardly of the rod and then curve downwardly. Thereafter the marginal edge 32 is helically wound around substantially the length the rod with the marginal edge 32 adhering to the rod by virtue of the adhesive thereon. The strip is then cut off adjacent the lower end of the rod a piece of pressure sensitized material is wrapped around the lower end. A portion 36 of the lower end of the rod 34 remains uncovered so that it may be inserted in the opening in the upright trunk for forming the artificial tree. The finished individual branch is best shown in FIGURE 6.

It will be seen that each of the fingers or needles 30 of the branch curves outwardly in a form of an arc from the rod 34. The arcuate curvature of the finger or needle 30 is formed by the series of spaced indentations or embossings 20 and the surfaces or facets 22 of the finger between the spaced indentations are substantially flat. In other words, it is the spaced indentations 20 which produce the curvature of the finger and maintain the curvature, whereas the surfaces or facets 22 between these indentations are substantially straight or flat. Thus, each finger has a series or plurality of surfaces or facets 22 which are struck by the light and this produces a brilliant and shimmering effect, particularly if aluminum is used. This catches the tiniest gleam of light and magnifies and radiates its brilliance.

The tip end 35 of the branch is of umbrella shape and the fingers thereof likewise have the indentations and facet surfaces and produce the same light reflections as previously described. When branches of the character herein described are inserted into a trunk to form a tree, the overall effect appearance-wise is different than that produced by branches of the character shown in the two prior art patents referred to herein. With branches of this invention the body of the tree appears to assume a fullness and completeness and is devoid of spaces, therefore, fewer branches are needed to form a full tree than would be necessary in the structures shown in the two aforementioned patents. In addition thereto, the light striking the segments or facets 22 of the fingers 20 produces a brilliance and shimmering effect which is incapable of being produced by trees of the prior art patents.

The branches herein formed are made very inexpensively and at no greater cost than that of the branches formed in accordance with the patents discussed, yet it produces an artificial tree which is a vast improvement over that of the prior art. The multiple light reflecting surfaces or facets of each finger gives the tree an unusual shimmering effect.

No invention herein is claimed in the construction of the tree apart from the branches, that is, applicants claim no invention in the formation of an upright trunk with removable branches. The invention herein is directed to the construction of the branch herein described and to the formation of a tree embodying said branches.

It will be understood that various changes and modifications may be made from the foregoing without departing from the spirit and scope of the appended claims.

What is claimed is:

1. A branch for an artificial tree, said branch formed of a strip of metal foil, said metal foil having a longitudinal securing portion along one marginal edge thereof and a plurality of foil fingers extending transversely from one side of said longitudinal securing portion, each of said fingers having a plurality of spaced, transverse, parallel indentations along the length thereof to form a plurality of facets and cause said fingers to assume a generally curving arcuate shape, a branch rod, and said strip having its longitudinal securing portion helically wound and secured to said branch rod with the fingers extending outwardly from said branch rod in an arcuate shape.

2. A branch as described in claim 1 wherein the spaced, transverse, parallel indentations are equidistantly spaced apart.

3. A branch as described in claim 1 wherein the strip is also wound around the outer end of the rod and secured thereto with the fingers forming a tassel shaped formation at the tip portion of said branch.

4. An artificial tree having a plurality of branches, each of said branches constructed as defined in claim 1.

5. An artificial tree having a plurality of branches, each of said branches constructed as defined in claim 3.

References Cited in the file of this patent

UNITED STATES PATENTS

| 1,588,274 | Schlosser | June 8, 1926 |
| 2,732,646 | James | Jan. 31, 1956 |
| 2,889,650 | Hankus | June 9, 1959 |

FOREIGN PATENTS

| 1,141,032 | France | Mar. 11, 1957 |